Feb. 16, 1932.  T. W. MENDENHALL  1,845,171
AUTOMOBILE ATTACHMENT
Filed May 2, 1929   2 Sheets-Sheet 1
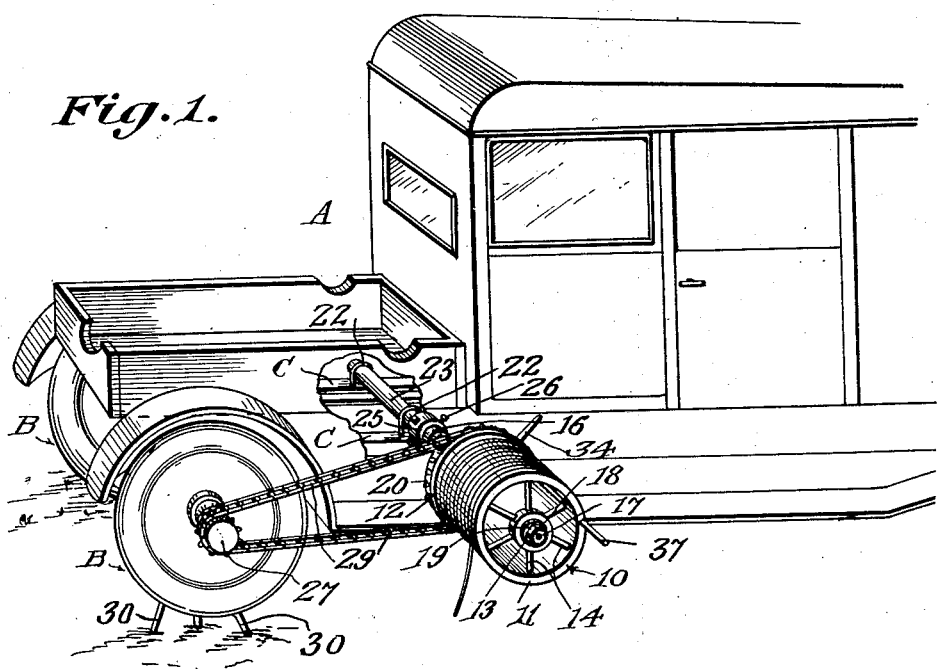
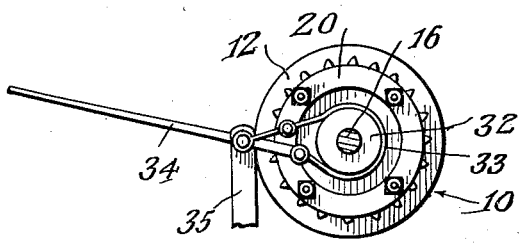
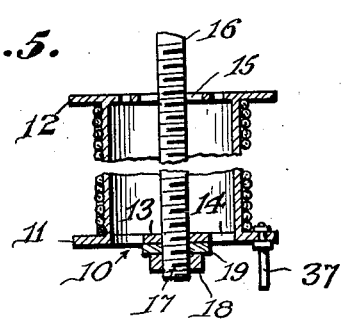
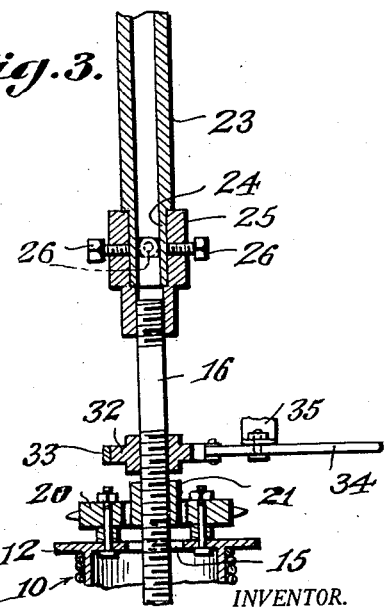
INVENTOR.
T. W. Mendenhall,
BY Parker & Snyder
ATTORNEYS Patented Feb. 16, 1932

1,845,171

UNITED STATES PATENT OFFICE

THOMAS W. MENDENHALL, OF WICHITA FALLS, TEXAS

AUTOMOBILE ATTACHMENT

Application filed May 2, 1929. Serial No. 359,977.

The invention relates to an automobile attachment, and more especially to a winch equipment for motor trucks.

The primary object of the invention is the provision of an attachment or equipment of this character, wherein the motor of the vehicle can be utilized as a power unit for driving the winch, the latter being of novel form, so that it can be carried by the vehicle and does not require any mechanical changes or alterations in the standard structural make up thereof.

Another object of the invention is the provision of an attachment or equipment of this character, wherein the power transmission for the winch is had directly from one of the rear wheels of the vehicle, and the winch journal is coupled with a piping which latter is mounted upon the chassis of the vehicle, in a novel manner, so that said attachment or equipment can be shifted from one side to the other of such vehicle.

A further object of the invention is the provision of an attachment or equipment of this character, wherein the parts are assembled with dispatch and the mounting within the vehicle is effected in a novel manner, without requiring any departure or change in the vehicle assembly, which in this instance is in the form of a motor truck.

A still further object of the invention is the provision of a winch attachment or equipment of this character, which is extremely simple in construction, thoroughly reliable and efficient in its purpose, strong, durable, readily and easily applied and detached from the motor vehicle of the truck type, and inexpensive to manufacture and install.

With these and other objects in view the invention consists in the features of construction, combination and arrangement of parts as will be hereinafter more fully described, illustrated in the accompanying drawings disclosing the preferred embodiment of the invention, and pointed out in the claims hereunto appended.

In the accompanying drawings:

Figure 1 is a fragmentary perspective view of a motor truck showing the winch attachment or equipment constructed in accordance with the invention applied thereto.

Figure 2 is an enlarged fragmentary detail plan view of the winch attachment or equipment, certain parts of the truck being in section.

Figure 3 is a fragmentary horizontal sectional view through the winch, piping and coupling with the latter.

Figure 4 is a sectional view on the line 4—4 of Figure 2.

Figure 5 is a fragmentary sectional view through the winch proper.

Figure 6 is a sectional view taken on the line 6—6 of Figure 2.

Figure 7 is a perspective view of the prop.

Similar reference characters indicate corresponding parts throughout the several views in the drawings.

Referring to the drawings in detail, A designates generally a motor truck, only a portion of the same being shown, and B the rear traction power wheels, while C the longitudinal side sills of the chassis of said vehicle. The drawings illustrate a motor truck, and the attachment or equipment is designed especially for use with this kind of truck, although it may be used on other light motor trucks of standard construction.

The winch attachment or equipment comprises a hollow drum 10 having flanged end heads 11 and 12, respectively, the outer head 11 being formed with a hub 13 and spokes 14 while the inner head 12 is provided with an open center 15 and this hub 13 is slipped onto a spindle 16 provided with threaded ends 17 and a lock nut 18 engages the outer threaded end of said spindle and works against a washer 19 abutting the outer head 11. Bolted or otherwise secured to the inner head 12 is a sprocket gear 20, the latter having its hub 21 threaded on the spindle.

Engaged in the side sills C of the chassis of the vehicle and removable therefrom are clevises 22 in which is journaled a piping 23 the same being disposed transversely of the vehicle at the proper distance forwardly of its rear wheels B. The piping is formed with a reduced end 24 on which is telescoped a coupling 25 the latter being held fast by bind- Feb. 16, 1932.  T. W. MENDENHALL  1,845,171
AUTOMOBILE ATTACHMENT
Filed May 2, 1929   2 Sheets-Sheet 2
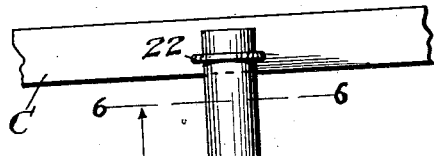
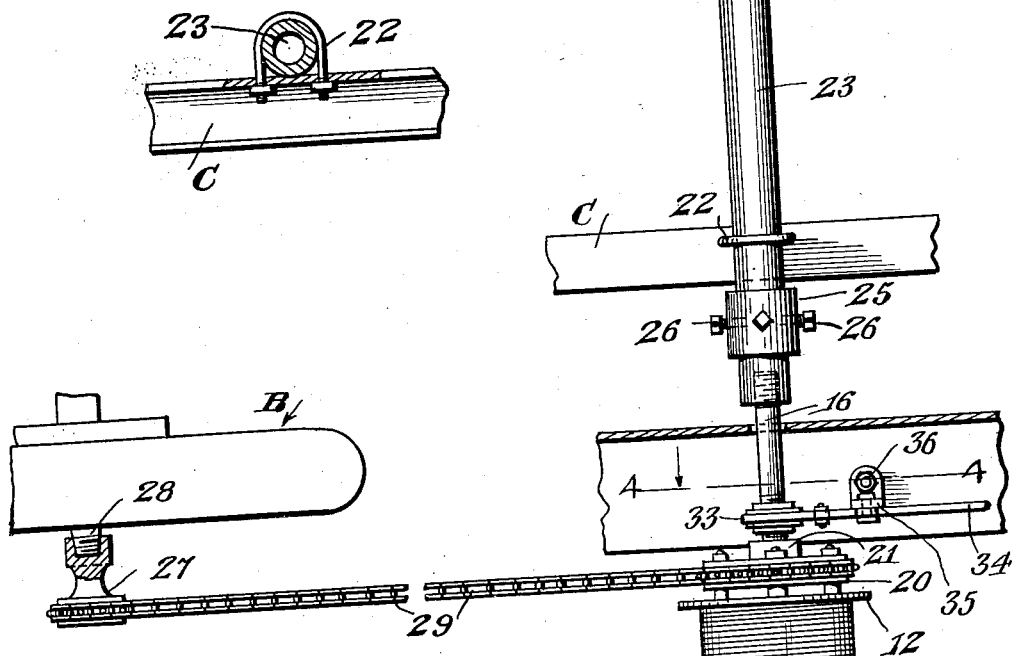
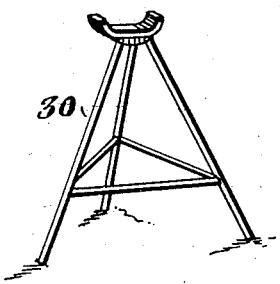
INVENTOR.
T. W. Mendenhall,
ATTORNEYS